July 12, 1966 R. G. RHUDY 3,260,209
ELECTROMAGNETIC PUMP
Filed Jan. 16, 1962 2 Sheets-Sheet 1

INVENTOR.
RALPH G. RHUDY
BY
ATTORNEY

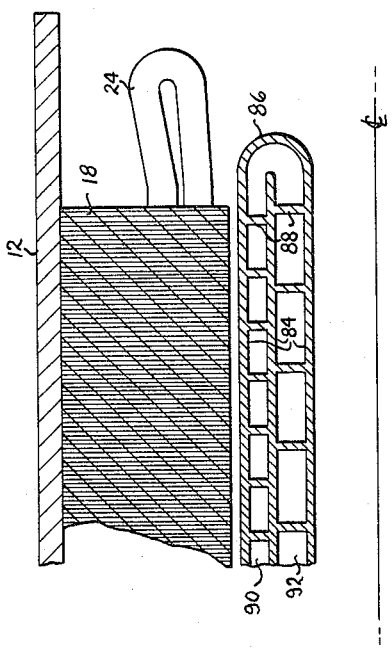
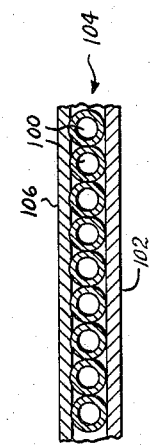
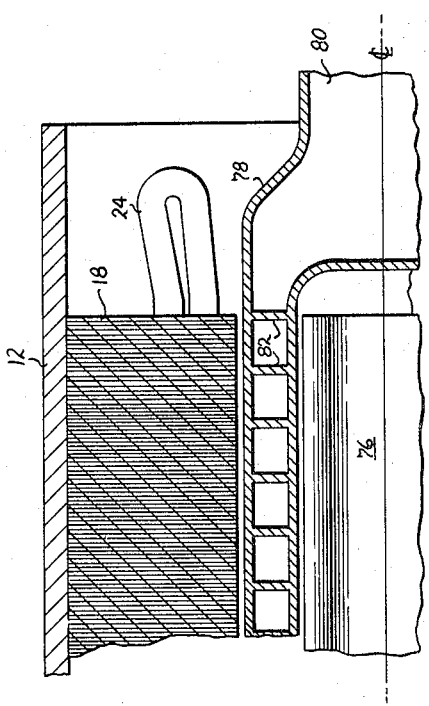
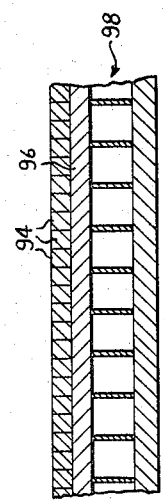

United States Patent Office 3,260,209
Patented July 12, 1966

3,260,209
ELECTROMAGNETIC PUMP
Ralph G. Rhudy, Scotia, N.Y., assignor to General
Electric Company, a corporation of New York
Filed Jan. 16, 1962, Ser. No. 166,655
8 Claims. (Cl. 103—1)

The invention described herein relates to pumps and more particularly to an electromagnetic pump useful in circulating liquid metal in a closed system.

The concept of utilizing electromagnetic devices for pumping liquid metals is old and pumps used for this purpose are either of the conduction or induction type. The disclosure of this invention is directed to those of the induction type.

My prior Patent 2,986,106, assigned to the same assignee as the present invention, discloses an electromagnetic pump of substantially square configuration having a polyphase winding disposed in a pair of spaced magnetic core sections. A duct of rectangular shape extends axially between the two core sections and is made of a material chosen to withstand the high temperature of a liquid metal, such as sodium. When the winding is energized, flux in the magnetic field links the liquid metal and acts to create sufficient force to cause its movement through a closed system.

Although this type of pump operates completely satisfactorily, it is subject to certain disadvantages. The duct necessarily must be made of a relatively long length and since duct length is a function of pressure, the highest practical attainable pressure of induction type pumps is in the neighborhood of 150 p.s.i. In the higher pressure ranges near this upper limit, the duct walls which are of thin cross-section, distort under the pressure, and also transmit forces to the magnetic cores, thus causing them to buckle or bow outwardly, particularly near the center. Perhaps a more important problem arises from thermal expansion of the duct along its axial length. Expansion joints therefore are needed to accommodate the changes in length, but at high temperatures, the containment materials have a reduced stress capability thus making it difficult to provide reliable joints for high temperature and pressure use.

In addition to the adverse effects flowing from duct distortion, insulation used for thermally isolating the duct from the heavy magnetic cores, is loaded in compression thus requiring it to perform the dual function of a thermal insulator and a mechanical support for heavy loads. This requirement places a limitation on the size and kind of materials suitable for use with the pump.

It is well known that the windings must be placed in close proximity to the duct to obtain efficient operation. However, the lack of metallic insulating materials capable of effectively protecting the electrical insulation against the heat of the hot liquid metal limits the operating temperature range of the pump to about 1000° F. Higher temperature ranges may be obtained but only at the sacrifice of pump efficiency because the windings must be moved a greater distance from the heat source and elaborate cooling means must be incorporated in the pump for maintaining the windings at a reasonably low temperature level.

In view of the present problems associated with prior art electromagnetic pumps, it is apparent that the need exists for a pump of smaller size having higher maximum pressure and temperature operating ranges.

An object of my invention therefore is to provide an electromagnetic pump of economical and compact design well adapted to motor manufacturing techniques.

Another object of my invention is the provision of a pump having operating temperatures and pressure levels greater than those of conventional design.

Another object of my invention is to provide a design in which an expansion joint is not required and in which differential expansion of the parts carrying the hot liquid metal and the structural parts is accommodated without the development of stress; and Still another object of my invention is to proivde a design of electromagnetic pump wherein standard electrical parts may be used to obtain variation in liquid pressure and flow rates merely by making minor changes in the overall design.

In carrying out my invention, I provide an electromagnetic pump employing a polyphase winding for imparting pressure to a liquid metal adapted for flow through a helically shaped duct positioned centrally in the pump body. After a pressure and velocity are imparted to the liquid, discharge from the pump may be from the same side as the inlet, or from the opposite end. The pump design permits the use of thermal insulation which performs an insulation function only, and is effective in completely safeguarding the ground insulation on the windings from the adverse influences of heat. By using standard electrical parts and manufacturing techniques, the designer is given great freedom in developing different sizes of pumps merely by making minor changes in the basic pump design comprising this invention.

While the specification concludes with claims particularly pointing out and distinctly claiming the subject matter which I regard as my invention, it is believed the invention will be better understood from the following description taken in connection with the accompanying drawing in which:

FIGURE 2 shows a modification wherein the duct inlet and outlet are located on opposite sides of the pump;

FIGURE 3 is another modification illustrating a duct design wherein the flow circuit includes an inlet and outlet on the same end of the pump;

Figure 1:
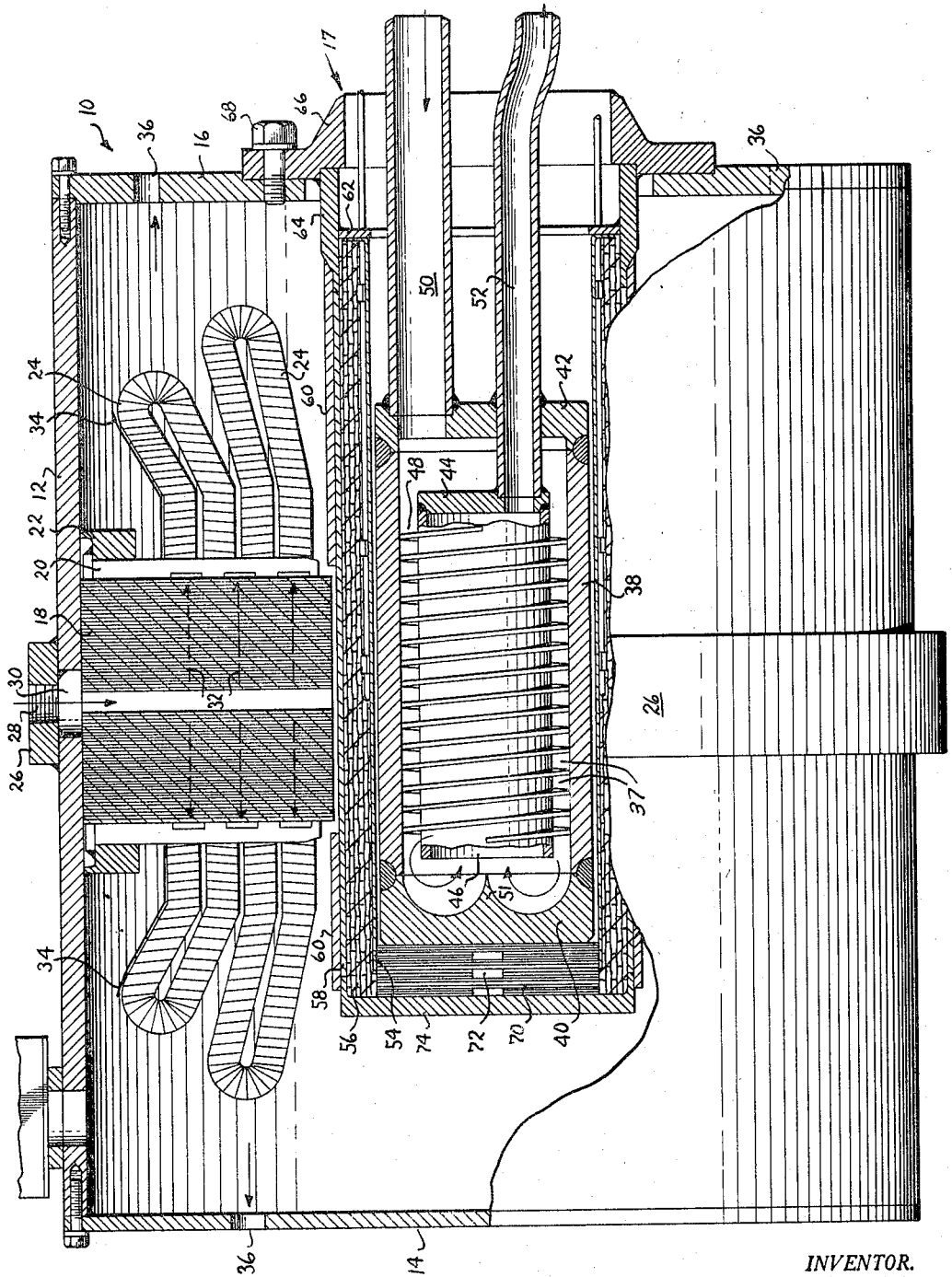
FIGURE 1 is a cross-sectional view in elevation, partly in section, illustrating the disposition of windings and parts forming the liquid flow circuit in the pump.

FIGURE 4 is another modification showing the use of laminated structural members which retain the pressure in the liquid metal by tensile stress but which reduce the pump losses by the well known manner by which laminated conducting parts reduce eddy currents and losses; and FIGURE 5 is still another modification of the duct in which commonly available structural parts, such as round or rectangular tubing is used in duct construction.

Referring now to the drawings wherein like reference characters designate like or corresponding parts throughout the several views, there is shown in FIGURE 1, a housing 10 of cylindrical configuration comprising a cylinder 12 closed at one end by a circular plate or disc 14, and at its other end by a plate 16. The plate 16 is equipped with a circular opening of a size sufficient to accept the pump components 17 through which liquid metal is circulated.

As shown, the pump comprises a magnetic core consisting of a multiplicity of laminations 18 held under compression by flanges 20 and rings 22 which are either welded or keyed to housing 12. A pump of this type normally requires a magnetic core and winding capable of producing a greater magnetomotive force than rotating electric machines of similar physical proportions. A large amount of copper therefore is needed in the slots to furnish the desired values of flux. Since the winding slots must be made of large size, the coils comprising the winding 24 may be inserted from the bore or from the outer peripheral surface. I prefer to use two or more layers of windings 24, although a single winding could be used, which can be installed separately and then interconnected after installation if desired. A pair of windings are more suitable because handling the resulting smaller coils is easier, and because cooling can be accomplished in a more efficient manner.

The close proximity of the winding 24 to the high temperature duct located in the stator bore makes cooling of the winding difficult. As shown in FIGURE 1, cooling is accomplished by a construction including an annular ring 26 having an inlet 28 welded to the surface of housing 12. Openings 30 in the housing serve to channel air into radially extending ducts 31, as in conventional magnetic cores, and appropriate axially extending passageways 32 in the laminations discharge the air on to the exposed surfaces of the coil end turns comprising windings 24. In order to assure the preferred direction of air flow, baffles 34 of glass tape impregnated with a thermosetting resin are positioned around the outer surface of the outer layer of end turns. By utilizing this kind of construction, the cooling air is circulated closer to the source of winding loss and also creates a greater surface area for the dissipation and transfer of heat. Openings 36 in the opposite end plates 14 and 16 exhausts the cooling air from the housing.

The liquid circulating components 17 located in the bore of the stator consists of a duct 37 formed by an annular ring 38 welded to oppositely disposed end plates 40 and 42. A hollow cylinder 44 open on the left side 46, as shown in FIGURE 1, and closed at its other end, is positioned within the annular ring to form the duct 37 therebetween. Vanes 48 disposed on the outer surface of the cylinder have their outer surfaces in contact with the inner surface of the ring to form helical passageways throughout the duct length. Liquid metal introduced through inlet 50 is required to follow the helical path formed by the vanes prior to reversing in direction with the help of deflector 51, for flow axially back through the cylinder to the outlet 52. The arrows illustrate the flow path. Obviously, vanes also may be provided on the cylinder inner surface but if space limitations make this undesirable, the liquid may be returned axially through the cylinder directly to the outlet. The advantage gained from this feature of construction is that unusual simplicity of design, assembly and disassembly, is achieved. Also, an expansion joint is not required and stresses associated with expansion of the pump duct due to changes in temperature are minimized.

Since the pump is designed to handle liquids at very high temperatures, i.e., greater than 1200° F., annular ring 38 and end plates 40 and 42, cylinder 44, vanes 48 and inlet and outlet tubes 50 and 52, are all made of a high temperature corrosion resistant alloy preferably comprising nickel, cobalt, chromium and tungsten. This type of alloy or its equivalent is especially suitable for higher temperatures in the range of 2000° F. An alloy such as Inconel or stainless steel can be used in the lower end of the temperature scale, i.e., about 1400° F.

In order to thermally isolate the high temperature duct from the stator core, a metallic sleeve 54 is positioned in spaced relationship with the annular ring 38, but with only sufficient clearance to permit insertion and removal of the cylinder 38. Thermal insulation 56 consisting of light weight and highly flexible metal strips are wrapped in overlapping relationship around the metallic sleeve 54, thus forming several layers effective in minimizing flow of heat toward the stator core and in minimizing the establishment of eddy current losses in the apparatus. The thermal barrier is made more effective by utilizing metal strips equipped with a corrugated surface of the type where the corrugations run diagonally on the strips. When the strips in adjacent layers are overlapped, the corrugations run in opposite directions and establish dead air spaces between adjacent layers. A metallic sleeve 58 preferably of stainless steel is welded or otherwise secured to a backing plate 74 and this assembly then is slipped over the outer layer of metallic strips. The outer surface of the metallic sleeve 58 provides a smooth surface for a pair of insulating sleeves 60 preferably comprising glass tape treated with a thermosetting resinous composition, which forms the outer surface of the pump components. As illustrated on the right side of FIGURE 1, the metal strips are held in position by an annular ring 62 welded to a backing plate 64 positioned around the insulation. The pump components and insulation are held in position at one end by an end support 66 secured to the end plate 16 by bolts 68.

Since the inner surface of end plate 40 is subjected to the heat of the liquid metal, metallic insulation 70 consisting of a multitude of thin flexible metal discs having a dimple 72 formed in its center is positioned between the end plate 40 and a backing plate 74 which forms an enclosure for the end of the pumping unit. These discs are loosely positioned in the end space and the dimples on each disc serve to space them a small distance apart to provide a multitude of dead air spaces between the end plate 40 and the inner surface of the corrosion member 74.

Although metallic strips of insulation have been disclosed in the preferred form of the invention, it will be apparent that many other types and designs of metallic or non-metallic insulation may be used. As indicated previously, the insulation is not subjected to compressive forces and therefore may be chosen for its insulating characteristics. Fibrous thermal insulation may be used, such as that commercially known as Micro-Quartz or Tipersul which may be applied in a single or plurality of layers. The invention also envisions use of an insulating material which may be poured or otherwise deposited in the space occupied by the metallic strips.

The pump of this invention is designed to handle liquid metals at very high temperatures, i.e., about 1200° F., where containment materials have a reduced stress capability and where the magnetic materials lose their magnetic properties unless cooled. The design of the above described pump for these temperatures is greatly simplified by the omission of the magnetic material normally used for the return magnetic path. A consequent reduction in the power factor results from this omission, but the resulting simplicity and economy in manufacture more than offsets this penalty.

The problems normally associated with differential expansion of dissimilar materials also are minimized by the construction described above because those parts which are contacted by the high temperature liquid metal are all made of the same material. A major advantage gained from doing so is that the need for an expansion joint which created expansion and distortion problems in the prior pumps is now eliminated. Moreover, the insulating materials used in thermally isolating the pumping components from the windings in the stator core can be chosen to perform only a thermal insulating function rather than being required to additionally withstand the mechanical loading that prior constructions impose on both the thermal insulation and the duct which carries the high temperature liquid metal.

In operation, the inlets 50 and 52 are connected to the suction and discharge sides of the pumping unit and with an external source through which the liquid metal is circulated. When the polyphase winding 24 is energized, a magnetic field is established in what normally would be the air gap, and its direction and intensity are such as to link the liquid metal introduced through the inlet 50. This magnetic field acts to impose a force on the liquid metal, thus causing it to traverse the passageways between the vanes 48 in a helical manner to the opposite end of the pump. Its direction then is reversed with the assistance of deflector 51 for flow axially through the cylinder 44 prior to discharge through the outlet 52.

As is well known, current flow will take place in the liquid metal because of the varying electromagnetic field, thus generating substantial amounts of heat therein, some of which is conducted through the insulation and into the cavities of the machine housing the winding end turns. The heat normally developed in the winding, in addition to that conducted from the liquid metal by way of the thermal insulation is carried out of the pump enclosure by cooling air circulated through the stator and across the winding end turns. When the pump is designed for operation at the higher temperature levels, e.g., 2200° F., the pumping components in contact with liquid metal preferably should operate in a vacuum to prevent oxidation of the operating parts. At these relatively high temperatures, the materials may comprise columbium metal, which is a refractory metal similar to molybdenum, tungsten, and others capable of operation at a temperature approaching 2200° F. As indicated previously, at lower temperatures, Inconel or stainless steel or other alloys may effectively be used. The pump vanes which are made of the same material, may be independently fabricated and then welded, brazed or shrunk onto the outer peripheral surface of the cylinder 44. In the preferred form, the cylinder initially is of a diameter the same as the outer surface of the vanes and is machined to the new diameter shown in FIGURE 1 to provide the vanes which then are integrally formed on its exterior surface.

It will be apparent that in lieu of employing ventilating air for cooling the stator core and the windings therein, the heat generated during pump operation may be absorbed by other conventional cooling arrangements. For example, a liquid carrying coil could be wrapped around the housing peripheral surface and since the temperature therein would be at a level substantially lower than that of the operating parts, heat normally would flow to such areas of lower temperature. Liquids useful for circulation through this type of heat exchanger would include water and refrigerant gases or other heat absorbing fluids.

The modification of FIGURE 2 utilizes a magnetic core 76 located in the stator bore but spaced therefrom a distance sufficient to accommodate a duct 78 designed for carrying the liquid metal. The duct is symmetrical about the pump center line and includes an inlet 80 extending to the passageways formed by vanes 82 located between the inner and outer walls comprising the duct. As in the previous embodiment, the vanes 82 form a helix, thus requiring the liquid metal to flow in a helical manner between adjacent vanes extending throughout the duct length, prior to its discharge on the opposite end of the duct. This design of pump is more efficient than the embodiment of FIGURE 1, although of somewhat more complicated design, because the laminated magnetic core 76 serves as a return magnetic path for the flux established in the air gap when the winding 24 is energized. The material comprising the duct 78 is of a high temperature, corrosion resistant type, as previously described, and it will be obvious that the vanes 82 may be formed between the inner and outer duct walls according to any one of a number of different manufacturing processes.

The modification in FIGURE 3 is somewhat similar to that disclosed in FIGURE 1 and is symmetrical about the center line shown on the drawings. The laminated magnetic core 18 and windings 24 are the same but the duct designed for carrying the liquid metal comprises three cylindrical members 84 joined at their ends by a U-shaped section 86 and equipped with helically disposed vanes 88 for causing the liquid metal to flow in a helical manner through the duct. In this design, the inlet 90 and outlet 92 are located at the same end of the pump. A magnetic core may or may not be used with this construction.

The embodiment of FIGURE 4 is designed to have the inlet and outlet at opposite ends of the pump or at the same end depending on whether a central magnetic core is used with the pump. The eddy currents in the outer wall which forms the duct are one of the principal sources of loss which contribute to low efficiency of electromagnetic pumps. These eddy currents flow principally in an axial direction. At high liquid metal temperatures, the low stress capability of available duct materials makes it necessary to use relatively thick walls in the outer duct, which thereby compounds the duct loss. The limiting stress in such a duct is the tangential tensile stress which is twice the axial tensile stress. The axial tensile stress may be made the limiting stress by the construction illustrated in this embodiment of the invention. As shown, the outer part of the duct is formed of a laminated helix 94 spirally wound on the outer wall 96 of duct 98. Since it is desirable to insulate this laminated helix from the duct and from the adjacent turns comprising the helix, an oxide or other coating of ceramic or other inorganic material may be deposited thereon for this purpose. An additional advantage gained by this kind of construction is that there is a substantial reduction in the eddy current losses while also imparting a greater degree of strength to the pump components. As an equivalent alternate, the helix may be replaced by a series of rings insulated in the manner described above.

In FIGURE 5, the helical passages for conducting the liquid metal may take the form of thin wall tubes 100 which are formed around an inner wall 102 of the duct 104. This assembly is then expanded into the outer wall 106 of the duct in a manner well known in the art. Upon completion of the manufacturing process, it will be seen that a pair of parallel paths for the flow of liquids through the duct are formed both inside and outside of the tubes 100. An attractive aspect of this design is that the pump may be permitted to develop very high pressures but only relatively thin wall tubes will be required because of the balancing of pressures which result from the flow of liquid both inside and outside the tubes 100.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. An electromagnetic pump comprising a housing enclosing a magnetic core having windings disposed therein, radial and axially extending ducts in said core for permitting the introduction of a coolant for flow through the core and across the end turns of said winding to remove the heat generated when the windings are energized, a hollow cylinder located within an enclosure positioned in the bore of the core, vanes attached at their inner ends on said cylinder and in contact with the inner surface of the enclosure for establishing a continuous passageway through which liquid metal is circulated when the winding is energized, an inlet to said enclosure through which the liquid metal flows to the passageways and an outlet connected with said cylinder, the disposition of the cylinder and enclosure and the inlet and outlet being such that liquid metal introduced through the inlet flows through said passageways and is returned axially through the cylinder for discharge through the outlet which is located on the same side of the cylinder as the enclosure inlet, and insulation means disposed between the outer surface of the enclosure and the bore of the core for minimizing the transfer of heat from the enclosure to the magnetic core when the liquid metal is moved by electromagnetic action through said passageways.

2. The combination according to claim 1 wherein the vanes forming said passageways are positioned on said cylinder in such manner as to have the liquid metal flow in a helical fashion from one end of the cylinder to the other.

3. The combination according to claim 1 wherein said vanes positioned on the peripheral surface of the cylinder form a passageway of helical design for flow of liquid therethrough, a deflector integrally formed with said enclosure and located adjacent the discharge side of said passageways for deflecting said liquid metal into said cylinder for axial flow toward said outlet.

4. The combination according to claim 3 wherein a second set of vanes are disposed within said cylinder for requiring the liquid metal to traverse a helical path from the outlet of said passageways to the outlet of said cylinder.

5. The combination according to claim 3 wherein said insulation means comprises a support member positioned in spaced relationship with said enclosure, and a multitude of layers of thermal insulation disposed on said support member and being spaced radially from the inner surface of the magnetic core.

6. The combination according to claim 5 wherein each layer of said thermal insulation comprises a continuous strip of flexible metallic material wound in overlapping relationship with the layers therebeneath, said strips of material having indentations thereon such that dead air spaces are provided between portions of the adjacent layers when the metallic material is wound in position.

7. The combination according to claim 4 wherein the outer surface of said enclosure is equipped with a metallic sleeve constituted of a multitude of turns positioned in contact with each other along the enclosure length for minimizing the adverse effects of eddy currents when said winding is energized.

8. The combination according to claim 5 wherein said duct comprises a multitude of turns of a hollow tube disposed in the space between said enclosure and the cylinder, and a second passageway formed around said tubes for conducting liquid metal from one end of the cylinder to the other.

References Cited by the Examiner

UNITED STATES PATENTS

| | | | |
|---|---|---|---|
| 1,298,664 | 4/1919 | Chubb | 103—1 |
| 2,224,505 | 12/1940 | Unger | 103—1 |
| 2,454,120 | 11/1948 | Atwell | 310—59 |
| 2,669,931 | 2/1954 | Godbold | 103—1 |
| 2,716,943 | 9/1955 | Vandenberg | 103—1 |
| 2,730,951 | 1/1956 | Donelian et al. | 103—1 |
| 2,770,196 | 11/1956 | Watt | 103—1 |
| 2,808,002 | 10/1957 | Erwin | 103—1 |
| 2,811,107 | 10/1957 | Brill | 103—1 |
| 2,817,780 | 12/1957 | Loutrel | 310—59 |
| 2,905,089 | 9/1959 | Blake | 103—1 |
| 2,953,993 | 9/1960 | Strickland | 103—87 |
| 2,985,106 | 5/1961 | Rhudy | 103—1 |
| 2,988,000 | 6/1961 | Blake | 103—1 |

FOREIGN PATENTS

| | | |
|---|---|---|
| 779,545 | 7/1957 | Great Britain. |
| 831,399 | 3/1960 | Great Britain. |
| 880,454 | 10/1961 | Great Britain. |

LAURENCE V. EFNER, *Primary Examiner.*